US008070965B2

(12) United States Patent
Tarves, Jr.

(10) Patent No.: US 8,070,965 B2
(45) Date of Patent: Dec. 6, 2011

(54) DUAL WALLED DYNAMIC PHASE SEPARATOR

(76) Inventor: Robert J. Tarves, Jr., Blenheim, NJ (US)

(*) Notice: Subject to any disclaimer, the term of this patent is extended or adjusted under 35 U.S.C. 154(b) by 1194 days.

(21) Appl. No.: 11/787,892

(22) Filed: Apr. 18, 2007

(65) Prior Publication Data
US 2008/0257819 A1    Oct. 23, 2008

(51) Int. Cl.
*B01D 21/26* (2006.01)
(52) U.S. Cl. ..... 210/787; 210/781; 210/788; 210/512.1; 210/512.3; 210/297; 210/299; 210/311; 210/321.69; 210/359; 210/367; 210/360.2; 210/486; 210/321.84; 210/321.68; 95/277; 55/401
(58) Field of Classification Search ............... 95/277; 55/400–401; 210/294, 297, 304, 299, 311, 210/321.67, 324, 359, 360.1, 367, 374, 416.1, 210/456, 402–404, 486, 321.64, 321.68, 210/331, 347, 360.2, 496, 510.1, 512.1, 512.2, 210/513, 781, 788, 787, 512.3, 321.84
See application file for complete search history.

(56) References Cited

U.S. PATENT DOCUMENTS

| | | | | |
|---|---|---|---|---|
| 254,364 | A | * | 2/1882 | O'Grady ............ 210/313 |
| 1,219,796 | A | | 3/1917 | Atkins |
| 2,565,343 | A | * | 8/1951 | Benham ............ 210/512.1 |
| 2,796,146 | A | * | 6/1957 | Hersey, Jr. et al. ........... 55/294 |
| 3,129,066 | A | * | 4/1964 | Ambrogi et al. ........... 422/140 |
| 3,251,469 | A | | 5/1966 | Muller |
| 3,322,277 | A | | 5/1967 | Pearson, Jr. |
| 3,353,340 | A | * | 11/1967 | Carsey ............ 55/324 |
| 3,437,208 | A | | 4/1969 | Kaspar et al. |
| 3,651,944 | A | * | 3/1972 | Shuttleworth ............ 210/265 |
| 3,740,820 | A | | 6/1973 | Tarves, Jr. |
| 3,800,505 | A | | 4/1974 | Tarves, Jr. |
| 3,864,124 | A | | 2/1975 | Breton et al. |
| 3,958,960 | A | | 5/1976 | Bakke |
| 3,997,447 | A | | 12/1976 | Breton et al. |

(Continued)

FOREIGN PATENT DOCUMENTS
CA     1143293     3/1983
(Continued)

OTHER PUBLICATIONS

"16403—Fiber Filtration Disc", Smith, Research Disclosure—publication No. 164, Dec. 1977 (3 pp.).

(Continued)

*Primary Examiner* — Tony G Soohoo
*Assistant Examiner* — David C Mellon
(74) *Attorney, Agent, or Firm* — Cheryl F. Cohen, LLC

(57) ABSTRACT

Separating a multi-phase mixture influent even during excessive flows of specific phases. The dynamic phase separator includes a chamber divided into two regions by an inner wall disposed radially inward relative to an outer wall. A gross separation region is defined between the inner wall and the outer wall, while a fine separation region lies inside an area defined by the inner wall and top of the chamber. Influent to be separated is fed through an inlet into the gross separation region. A plurality of porous disks are mounted to a rotatable shaft and disposed in the fine separation region. The outer and inner walls are separated by a predetermined distance sufficient to allow for adequate rotational velocity of incoming tangential flow of the influent and dwell time sufficient for natural separation of lighter phases from heavier phases within the gross separation region.

15 Claims, 3 Drawing Sheets

U.S. PATENT DOCUMENTS

| | | |
|---|---|---|
| 4,080,705 A | 3/1978 | Bailey |
| 4,120,911 A | 10/1978 | Davidson |
| 4,145,191 A | 3/1979 | Kunchal et al. |
| 4,184,952 A | 1/1980 | Stewart |
| 4,186,100 A | 1/1980 | Mott |
| 4,205,939 A | 6/1980 | Reyes |
| 4,205,940 A | 6/1980 | Golick |
| 4,213,732 A | 7/1980 | Cooper, Jr. |
| 4,216,893 A | 8/1980 | Glatthorn |
| 4,219,342 A | 8/1980 | Workman |
| 4,224,153 A | 9/1980 | Muller |
| 4,243,635 A | 1/1981 | Aeberli |
| 4,246,108 A | 1/1981 | Croopnick et al. |
| 4,273,509 A | 6/1981 | Erickson |
| 4,277,349 A | 7/1981 | Schwingmammer |
| 4,287,138 A | 9/1981 | Buckner |
| 4,347,652 A | 9/1982 | Cooper, Jr. et al. |
| 4,454,983 A | 6/1984 | Tarvis, Jr. |
| 4,473,380 A | 9/1984 | Voliva et al. |
| 4,487,616 A | 12/1984 | Grossman |
| 4,624,784 A | 11/1986 | Lefebvre |
| 4,676,511 A | 6/1987 | Mackie |
| 4,682,990 A | 7/1987 | Kagstrom et al. |
| 4,695,191 A | 9/1987 | Wagstaff |
| 4,698,156 A | 10/1987 | Bumpers |
| 4,710,284 A * | 12/1987 | Amit ................. 209/17 |
| 4,717,485 A * | 1/1988 | Brunsell et al. ........... 210/781 |
| 4,784,835 A | 11/1988 | Fritz |
| 4,898,600 A | 2/1990 | Ishibashi et al. |
| 4,919,696 A | 4/1990 | Higashi et al. |
| 4,936,986 A | 6/1990 | Tarves, Jr. |
| 5,037,562 A | 8/1991 | Tarves, Jr. |
| 5,108,469 A | 4/1992 | Christ |
| 5,116,516 A * | 5/1992 | Smisson ................. 210/747 |
| 5,123,936 A | 6/1992 | Stone et al. |
| 5,154,734 A | 10/1992 | Yung |
| 5,176,723 A | 1/1993 | Liu et al. |
| 5,219,490 A | 6/1993 | Basu et al. |
| 5,229,014 A | 7/1993 | Collins |
| 5,232,588 A | 8/1993 | Gryder |
| 5,256,437 A | 10/1993 | Degen et al. |
| 5,395,531 A | 3/1995 | Degen et al. |
| 5,401,523 A | 3/1995 | Degen et al. |
| 5,449,390 A | 9/1995 | Duncan et al. |
| 5,464,458 A | 11/1995 | Yamamoto |
| 5,567,615 A | 10/1996 | Degen et al. |
| 5,578,213 A | 11/1996 | Miller et al. |
| 5,639,366 A * | 6/1997 | Bazell et al. ................. 210/304 |
| 5,666,323 A | 9/1997 | Zagar |
| 5,676,715 A | 10/1997 | Kalka et al. |
| 5,707,426 A | 1/1998 | Kalka et al. |
| 5,730,554 A | 3/1998 | Mosley et al. |
| 5,753,012 A | 5/1998 | Firnhaber et al. |
| 5,787,821 A | 8/1998 | Bhat et al. |
| 5,792,351 A | 8/1998 | Wehrle et al. |
| 5,826,518 A | 10/1998 | Bhat et al. |
| 5,894,889 A | 4/1999 | Dewey et al. |
| 5,894,935 A * | 4/1999 | Stein ............................. 209/210 |
| 6,129,781 A | 10/2000 | Okamoto et al. |
| 6,136,074 A | 10/2000 | Okamoto et al. |
| 6,230,551 B1 | 5/2001 | Burniston |
| 6,240,985 B1 | 6/2001 | Mason |
| 6,341,667 B1 | 1/2002 | Ahlbom et al. |
| 6,558,545 B1 | 5/2003 | Blase et al. |
| 7,238,281 B2 * | 7/2007 | Su et al. ................. 210/170.03 |
| 2004/0251214 A1 * | 12/2004 | Adams ........................ 210/748 |
| 2006/0123744 A1 | 6/2006 | Read |

FOREIGN PATENT DOCUMENTS

| | | |
|---|---|---|
| DE | 2331991 | 1/1975 |
| EP | 0176122 | 4/1986 |
| FR | 1544596 | 9/1968 |
| GB | 617677 | 2/1949 |

OTHER PUBLICATIONS

"Desalination by Reverse Osmosis", Sherwood et al., publication by MIT, Feb. 1967 (pp. 2-12).

* cited by examiner

DUAL WALLED DYNAMIC PHASE SEPARATOR

BACKGROUND OF THE INVENTION

1. Field of the Invention

The present invention is directed to a dynamic phase separator for separating heavier phases from lighter phases of a multi-phase mixture, e.g., oil, water and gas; lighter fluids from heavier fluids; gas from liquids; or solids from liquids. In particular, the present invention relates to an improved dynamic phase separator with a dual wall chamber for improved separation efficiency even during excessive flows of specific phases within the phase mixture.

2. Description of Related Art

U.S. Pat. Nos. 4,936,986 and 5,037,562 are directed to a dynamic phase separation (DPS) system and each is herein incorporated by reference in their entirety. In theses patented systems, the establishment of a barrier layer is critical to the proper operation of the phase separator. The patented system is therefore suitable only when the percentage of the phase to be separated such as oil present in the fluid mixture to be separated is not excessive within the vessel and, specifically, proximate the porous filter disks. However, a rapid increase in flow or unstable flow condition hereinafter referred to as a "slug" in the influent to be separated is not uncommon. As the percentage of the phase to be separated from the fluid mixture increases at some point the efficiency of separation of that phase decreases using these conventional patented DPS system. Such failure in operation is a result of the manufacture of the filter disks using materials that have an affinity to water rather than oil. Once saturated or wet with excessive quantities of oil thereafter the membrane of the filter disk will have an affinity for oil rather than water and thus no longer be able to effectively separate the phases.

By way of illustrative example, the patented DPS is able to provide effluent discharge below 15 ppm of oil, with the influent containing 10,000 ppm of oil content, in oil/water/detergent mixtures. If the oil content ratio becomes too high (severe slugging), the rotary filtration disks may become prewetted or saturated with oil that pass through the boundary layer itself thereby reducing the effectiveness of the separating device. Thus, slugging at some point will decrease efficiency. Accordingly, at some level a flow imbalance may reduce the efficiency of separation and be undesirable depending on such factors as the amount of imbalance and the desired purity of the effluent discharge.

It is therefore desirable to develop an improved dynamic phase separator that is suitable for influent regardless of excessive flow imbalance in the feedstock of unwanted product by maintaining adequate rotational velocity and dwell time for the natural separation of lighter phases from heavier phases, e.g., lighter liquids from heavier liquids, lighter gases from heavier liquids and lighter solids from heavier liquids.

SUMMARY OF THE INVENTION

An object of the present invention is to design a dynamic phase separator with improved selective separation between lighter and heavier phases in a multi-phase mixture.

Another object of the present invention is to design a dynamic phase separator for handling severe slugging or gross imbalance of the feedstock.

Specifically, the present inventive dynamic phase separator is designed to improve selective liquid droplet separation and selective solid particle separation.

Still a further object of the present invention is to configure a dynamic phase separator for achieving continuous particle and liquid separation in a single device.

The invention is directed to a dynamic phase separator for separating a multi-phase mixture influent even during excessive flows of specific phases. A chamber of the dynamic phase separator is divided into two regions by an inner wall disposed radially inward relative to an outer wall. A gross separation region is defined between the inner wall and the outer wall, while a fine separation region lies inside an area defined by the inner wall and top of the chamber. Influent to be separated is fed through an inlet into the gross separation region. A plurality of porous disks are mounted to a rotatable shaft and disposed in the fine separation region. The outer and inner walls are separated by a predetermined distance sufficient to allow for adequate rotational velocity of incoming tangential flow of the influent and dwell time sufficient for natural separation of lighter phases from heavier phases within the gross separation region.

BRIEF DESCRIPTION OF THE DRAWING

The foregoing and other features of the present invention will be more readily apparent from the following detailed description and drawings of illustrative embodiments of the invention wherein like reference numbers refer to similar elements throughout the several views and in which.

DETAILED DESCRIPTION OF THE PRESENTLY PREFERRED EMBODIMENTS OF THE INVENTION

Figure 1:
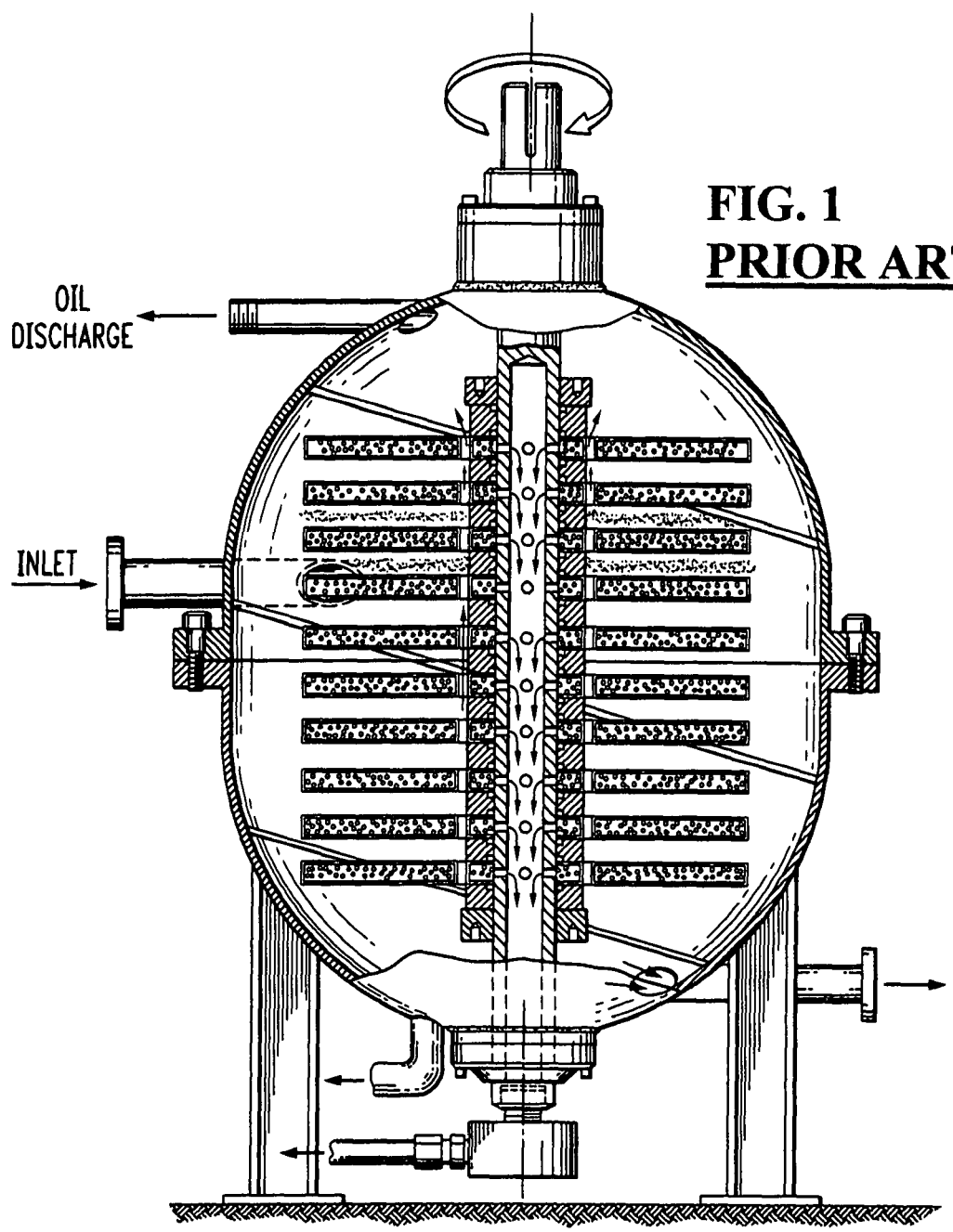
FIG. 1 depicts a partially cutaway front view of a prior art dynamic phase separator with a rotary disk filter.
Figure 5:
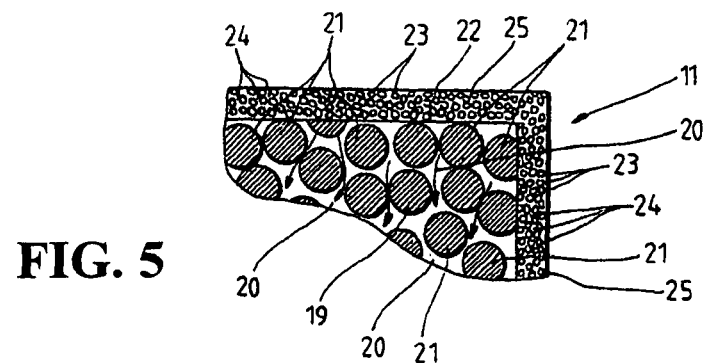
FIG. 5 depicts an enlarged cross-sectional view of a section of a filter disk in FIG. 2.
Figure 2:
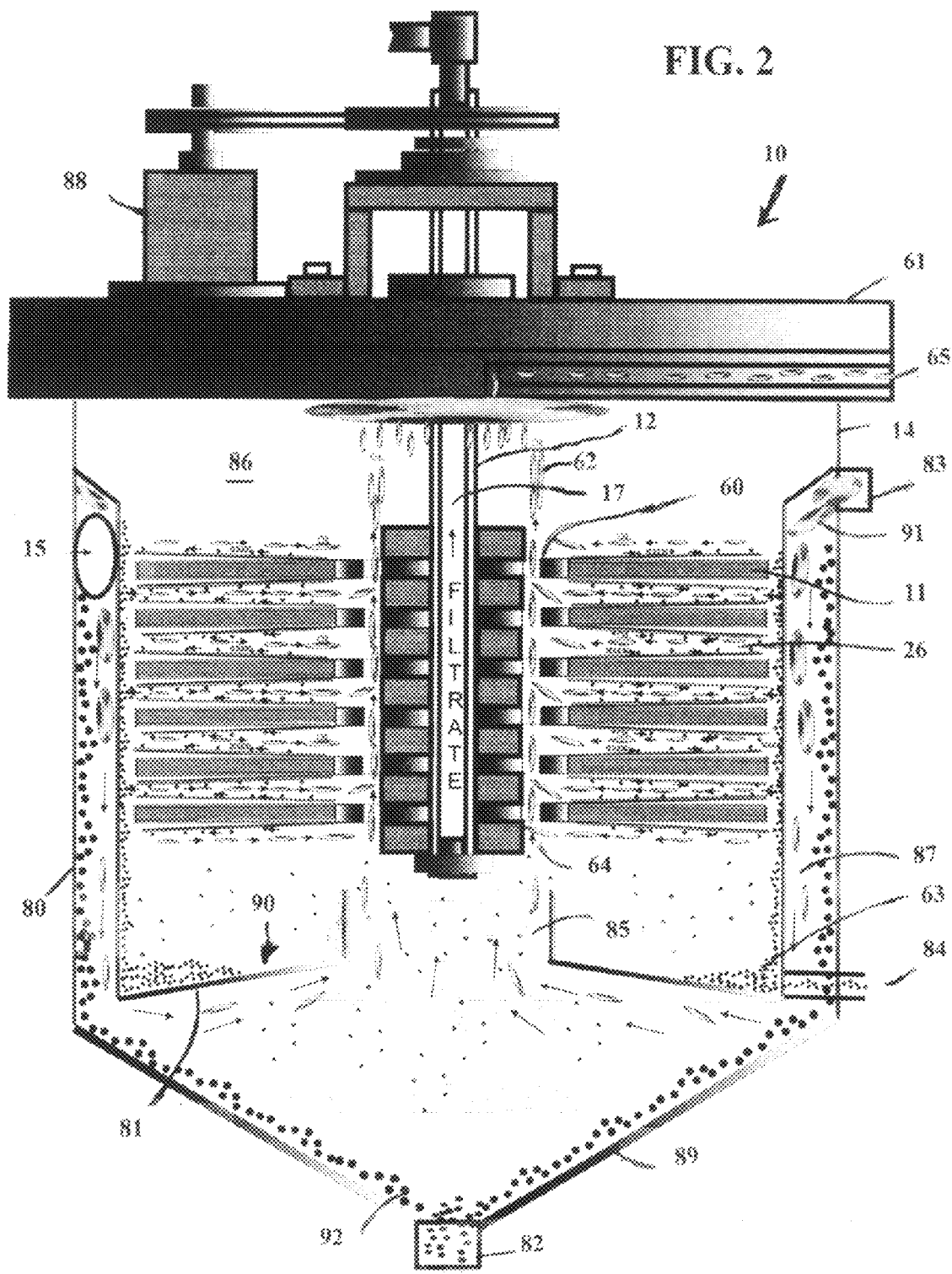
FIG. 2 depicts a partially cutaway front view of a dual walled dynamic phase separator in accordance with the present invention.

FIG. 2 is a cross-sectional view of a dynamic phase separator (DPS) in accordance with the present invention indicated generally by the numeral 10. The dynamic phase separator 10 includes a plurality of filter disks 11 formed from multiple layers of differing pore size, all mounted on a hollow shaft 12. Specifically, disk 11 is constructed using an inside core 19 that has relatively large pores, while a relatively thin filter membrane 22 having relatively smaller pores covers the internal core 19, as shown in FIG. 5. Hollow shaft 12 is rotatably driven by drive motor 88 within a substantially impermeable chamber 14 divided into two regions by a non-porous inner wall 81 disposed radially inward relative to an outer wall 80. The volume between inner wall 81 and outer wall 80 defines a region therebetween referred to as a gross separation region 87. A fine separation region 86 is that area within the boundary defined by the inner wall 81 and top 61 of the chamber 14. The filter disks 11 are disposed in the fine separation region 86.

Outer and inner walls 80, 81, respectively, are separated from one another by a predetermined distance to allow for adequate rotational velocity of incoming tangential flow of influent and dwell time sufficient for the natural separation of a gross amount of lighter phases from heavier phases, for example, lighter liquids and gas from heavier liquids as well as heavy solids within the gross separation region 87. Competing interests come into play when designing the distance separation between outer and inner walls 80, 81, respectively, of the chamber 14. On the one hand the greater the separation distance between the walls the increased dwell time for the imbalance to be processed in the gross separation region 87, while, on the other hand, the largest volume for the fine separation region 86 is preferable to achieve the highest rotational velocity spin off of unwanted product. In addition to these considerations, the distance separation between outer and inner walls, 80, 81, respectively, is also dependent on such factors as (i) the flow rate of influent or feedstock and (ii) anticipated potential flow imbalance of slugs (e.g., oil or water slugs). Addressing each factor separately, the greater the flow rate of influent or feedstock the greater the potential flow imbalance over a relatively short period of time, whereas the slower the flow rate any potential flow imbalance would be over a longer period of time. In the case of a higher flow rate of influent a greater distance separation between outer and inner walls is preferable in order to accommodate abrupt changes or imbalance of excessive amounts. With a lower flow rate of influent, however, any change in content ratio will have less impact on overcoming the filter disks, thus a smaller distance separation between outer and inner walls 80, 81, respectively, may be sufficient.

Another factor to be considered in designing the distance separation between outer and inner walls is the anticipated potential flow imbalances of slugs. If the influent being separated is known to repetitively contain severe slugs than a greater distance separation will be employed to accommodate such anticipated imbalance. Otherwise, if any imbalance is anticipated as a rarity, if at all, then a relatively small volume gross separation region 87 would be adequate and most efficient.

Outer and inner walls 80, 81, respectively, are connected so that the top end of gross separation region 87 is bounded or closed to prevent the flow of influent from the gross separation region 87 to the fine separation region 86. On the other hand, at the opposite lower end of the gross separation region 87 walls 80, 81 remain unbounded thereby permitting the gross separated influent to pass freely from the gross separation region 87 into the fine separation region 86. An inlet 15 is defined in the outer wall 80 proximate the bounded or closed top end of the gross separation region 87 to introduce the flow of influent or feedstock substantially tangentially into the gross separation region 87. The influent is fed into the inlet 15 via a pump (not shown). Outer wall 80 also has defined therein proximate the bounded or closed top end of the gross separation region 87 a first gross separated discharge outlet 83 for the discharge of a separated lighter phase such as a lighter phase liquid and/or gas. In a preferred embodiment shown in FIG. 2, a portion of the outer and inner walls, 80, 81, respectively, are substantially cylindrical in shape and substantially concentric so that the gross separation region 87 forms an annulus volume therebetween. The shape of the outer and inner walls 80, 81, respectively, may be modified, as desired, and need not share a common center.

A lower portion of outer wall 80 is tapered in a direction away from the hollow shaft 12 to form a substantially cone shape lower funnel or hopper 89. A second gross separated discharge outlet 82 is defined proximate the tip of the lower funnel or hopper 89 such as for the discharge of a heavier phase solid and/or liquid. The tapered outer wall 80 channels the gross heavier phase separated in the gross separation region 87 to collect at the second gross separated discharge outlet 82. Inner wall 81 forms an inverted funnel or hopper 90 that is tapered in a direction opposite or reverse to that of the lower funnel or hopper 89, i.e., tapered in a direction towards hollow shaft 12. An opening 85 preferably substantially aligned with the second gross separated discharge outlet 82 is defined in the inverted funnel or hopper 90. Gross separated influent from the gross separation region 87 rises upwards in the chamber through the opening 85 of the inverted funnel or hopper 90 into the fine separation region 86. In the fine separation region 86 heavier phases 63 (e.g., heavier solids) are separated out from the gross separated influent and fall due to gravity wherein they are collected in the inverted funnel or hopper 90. A second fine separated discharge outlet 84 extends through both the inner wall 81 and outer wall 80 allowing the collected fine separated heavier phases 63 to exit from the separation device 10.

The filter disks 11 each have defined laterally therein relief holes 60 proximate the shaft 12. Relief holes 60 extend laterally through each disk 11, and collectively provide a substantially vertical path or relief passageway 64 to the top 61 of the chamber 14. Lighter fine phase separated product such a liquid or a gas 62 with a relatively low specific gravity which may rise in the slurry passes through the relief passageway 64 and accumulates proximate the top 61 of the chamber 14 before being expelled through first fine separated discharge outlet 65.

The filter disks 11 are preferably made from stainless screens or stainless sintered metal particles 21 and 23. For example, the filter disks 11 may be fashioned from compressed sponge iron. The filter disks 11 are porous and allow the passage of fluid therethrough. Sponge iron in a powdered or particle form may be heated until red hot in a mold conforming to the shape of a filter disk 11. The sponge iron is preferably not heated to its melting point. Pressure is preferably applied to the red hot sponge iron to form the filter disk 11. The objective of this fabrication technique is to form a filter disk 11 which is porous. A description of an exemplary porous metal filter is provided in U.S. Pat. No. 4,186,100, issued Jan. 29, 1980, the disclosure of which is herein incorporated by reference in its entirety.

Disk filters 11 have an internal core 19 with relatively large pores, for example, approximately 20 micron or larger pores. Relatively large interstices or pores 20 are formed between the sintered particles 21 which form the internal core 19. This is clearly seen in the enlarged cutaway view of FIG. 5. Interstices 20 rather than perform significant filtration functions instead freely allow the passage of fluid through the interstices 20 to the channel 17 in the hollow shaft 12. The internal core 19 provides structural strength for the filter disks 11. Filter disks 11 formed with such an internal core 19 have superior structural strength as compared to a filter disk with a hollow core. An internal core 19 constructed in this manner also provides advantages of manufacture.

Filter disk 11 is provided with a relatively thin filter membrane 22 or outer layer having interstices 24. The filter membrane 22 is preferably formed from sintered particles 23. Relatively small interstices 24 are formed between the small sintered particles 23 of the filter membrane 22. The interstices 24 are relatively small, for example on the order of approximately 0.5 microns, not so much for the purpose of excluding undesired particles 63 which may be present in the fluid to be separated, but to substantially reduce if not eliminate turbulent fluid flow at the exterior surface 25 of the disk 1. The relatively small interstices 24 result in a substantially smooth exterior surface 25 of the filter membrane 22. Substantially smooth exterior surface 25 reduces the amount of turbulence induced in the fluid when the disks 11 are spun at relatively high speeds. The elimination or substantial reduction of turbulence proximate the exterior surface 25 of the disk 11 is critical to the establishment of a barrier layer 28. The use of conventional wire mesh is unsatisfactory because wire mesh would cause too much turbulence when the filter disks 11 are rotated at relatively high speeds.

The substantially smooth exterior surface 25 permits the formation of a barrier layer 28 (FIG. 4) in the fluid to be separated along the surface 25, if the filter disks 11 have a sufficiently large diameter and are rotated at sufficiently high speeds. Barrier layer 28 inhibits the passage of particles to the exterior surface 25 of the filter membrane 22. While the barrier layer 28 inhibits particles from contacting the surface 25 of the disk 11, fluid will diffuse across the barrier layer 28 under appropriate pressure conditions. This unique action prevents relatively small particles from clogging the filter disks 11 thereby substantially reducing, if not eliminating, the need for cleaning operations and consequently expensive down time.

Filter disk 11 may be manufactured by applying a relatively thin layer of finely powered material 23 to the internal core 19 which is pressed and adhered to both sides of the core 19 so that the core 19 is surrounded by a relatively thin layer 22. The disk 11 is then subjected to a controlled temperature (depending on the material) in an inert atmosphere (e.g., nitrogen or argon) to bond or sinter the material 23 together.

A pressure drop will occur across a filter medium with such relatively small interstices 24. For this reason, the filter membrane 22 is preferably made as thin as possible. The pressure drop across the material 21 of the internal core 19 with its relatively large pores 20 is not as great for a given thickness as the pressure drop which occurs across the filter membrane 22 with its relatively small interstices 24. This multilayer construction provides effective filtration and significant structural strength while minimizing the pressure drop across the filter disk 11.

Figure 6:
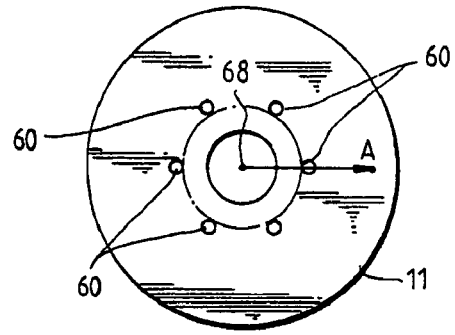
FIG. 6 is a schematic illustration of a filter disk for purposes of explaining the relationship of radial distance to surface velocity.

A significant factor involved in the establishment of a barrier layer 28 is the surface velocity of the rotating disks 11. The surface velocity of the disks 11 will depend on the radius "r" of the disk 11 and the rotation speed of the disk 11. This is described in greater detail with reference to FIG. 6. For example, for a given point "A" on the surface of a disk 11, the point will travel the distance $2\pi r$ during one revolution of the disk 11, wherein "r" is the radius of the point "A" from the axis of rotation 68 of the shaft 12. The surface velocity at point A will be related to the distance traveled in one revolution multiplied times the number of revolutions per unit of time.

This relationship may be expressed as:

$$[X\, 2\pi r_A]/60$$

where,

X=revolutions per minute of the disk, and
$r_A$=the radius of the disk at point A, expressed in feet.

Division by 60 gives a result expressed in feet per second. In this context, a surface velocity of at least approximately 15 feet per second will be needed to establish a barrier layer effect in water, an aqueous solution, or a liquid slurry. Otherwise, a surface velocity of approximately 25 feet per second or greater is preferred.

An appropriate combination of the interrelated parameters of disk diameter and rotational velocity is selected to establish a barrier layer effect. Such a barrier layer effect cannot be achieved with relatively high frequency backpulsing which would destroy any such barrier layer, even if one did form.

Figure 7:
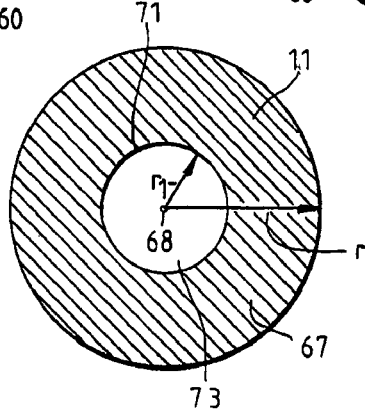
FIG. 7 is a schematic illustration of a filter disk showing the critical radius beyond which a barrier layer is established.

In practice, the surface velocity should exceed a threshold value needed to establish a barrier layer 28 at some radial distance "$r_1$" which is less than the radius of the disk "r", as shown in FIG. 7. The radius "$r_1$" at which the "threshold surface velocity" is achieved is hereinafter referred to as the "threshold radius".

In practice, relatively high speed rotation typically results in an annular effective filtration area, or active area 67, outside the circle 71 defined by the threshold radius $r_1$. A blinded area 73 inside the threshold radius $r_1$ has an insufficient surface velocity to create a barrier layer effect, and will tend to clog. Filtration occurs over the working area 67, and not in the blinded area 73.

If the radius "r" of the disk 11 is too small, the entire disk 11 may lie within the blinded area 73. In that event, no barrier layer 28 will be created and frequent backpulsing will be required.

If the speed of rotation is increased, the threshold radius "$r_1$" will shrink. Thus, the active area 67 can be increased by increasing the speed of rotation. Conversely, if the speed of rotation is too small, the active area 67 will shrink, or perhaps disappear altogether.

The relief holes 60 may be provided in the blinded area 73 without detracting from the active area 67.

Another way of defining the desirable conditions for establishing a barrier layer 28 is that the product of:

$$[X\,\pi r]/30$$

is preferably greater than approximately 15 feet per second if the fluid is water, an aqueous solution or a liquid slurry, and is preferably greater than approximately 25 feet per second, otherwise; wherein, X is the revolutions per minute of rotation of the disk 11, and r is the radius of the disk 11, expressed in feet.

The combination of parameters that are utilized in a filter 10 are preferably within this range to provide satisfactory results. For example, a disk 11 with a diameter greater than approximately 5 inches can be rotated at speeds greater than approximately 700 rpm in a liquid slurry. A disk 11 with a diameter greater than approximately 4 inches can be rotated at speeds greater than approximately 900 rpm in a liquid slurry. Because of unpredictability of the barrier layer effect in gas, as compared with a liquid, the above examples do not necessarily apply to gas or air.

In summary, the larger the diameter of the disks 11, the lower the rpm rate at which a barrier layer 28 can be created. If the filter disks 11 are too small, the disks 11 will have to be rotated so fast that the barrier layer 28 may be prevented from forming due to turbulence. Thus, if the diameter of the disk is too small it may be virtually impossible to create a barrier layer because the disks cannot be turned fast enough to achieve the required surface velocity without creating too much turbulence.

The speed of rotation may affect the ability to separate oil and water. The disks 11 are designed to have a sufficiently large diameter so that they may be rotated slow enough to permit the oil droplets 62 to pass through relief holes 60 without undue dispersion, yet the active area 67 of the disks 11 has a large enough surface velocity to establish a barrier layer 28 at the given speed of rotation.

It is desirable to develop a positive pressure in the chamber 14 to cause the fluid to diffuse across the barrier layer 28 and through the filter disk 11. If the pressure is too great, the oil droplets 62 will be forced through the disks 11. Thus, the pressure within the chamber 14 is preferably set to below a level that would result in the passage of oil 62 through the disks 11. But if the pressure is not high enough, the flow rate of discharge from the second fine separated discharge outlet 84 will be too small as to be economically unviable.

Figure 4:
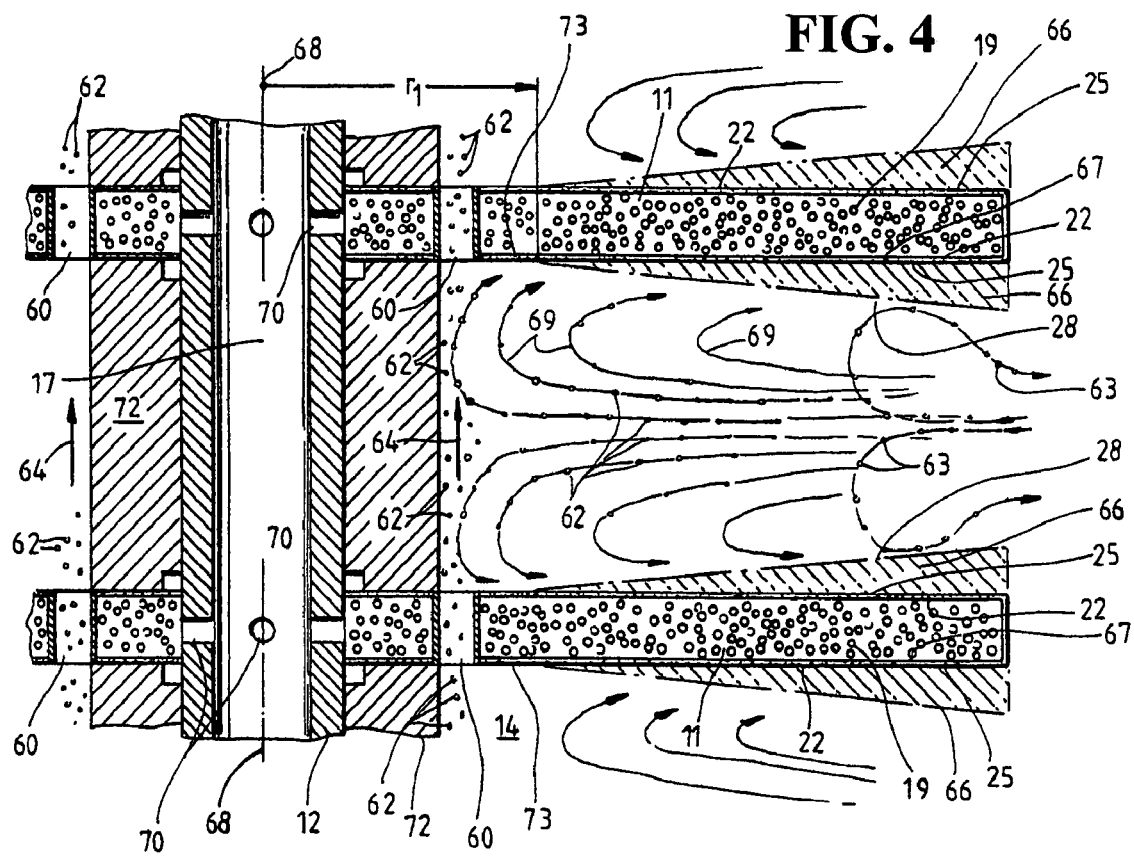
FIG. 4 depicts an enlarged partially schematic cross-sectional view of the area between the two filter disks in FIG. 2 illustrating the flow of oil droplets under optimum operating conditions.

When the substantially smooth surface disks 11 are rotated at a sufficiently high speed to give the surface 25 of the disks 11 a relatively high surface velocity, which depends on the diameter of the disks 11, a film of fluid 66 immediately next to the disks 11 will tend to rotate at the same velocity as the disks 11, as illustrated in FIG. 4. The difference in velocity of this surface film 66 and the remainder of fluid in the chamber 14 occurs at the barrier layer 28. At this point of relatively high velocity shear, many particles 63 are expelled radially outward towards the inner wall 81 for eventual discharge as a concentrated stream from the second fine separated discharge outlet 84. At relatively high surface velocities, this barrier layer 28 is the location where most of the particles 63 are separated from the fluid. Because most particles 63 do not reach the disk surface 25, such particles 63 do not clog the filter disks 11.

Because the film of fluid 66 immediately adjacent the filter disks 11 rotates with the disks 11, in effect, the infeed at the disks 11 is essentially static. Thus, a "static" layer 66 is formed between the barrier layer 28 and the surface 25 of the disk 11 which is substantially static relative to the rotating disk 11. In other words, the "static" layer 66 rotates with the disk 11 at substantially the same speed. The positive pressure in the interior of the chamber 14 urges the fluid into the disks 11. In order to pass through the surface 25 of the rotating disks 11, the fluid in the "static" layer 66 at the surface 25 of the disks 11 must flow in a direction substantially perpendicular to the disk surface 25.

The present invention does not use centrifugal force internal to the disks 11 to achieve particle separation. Particles 63 which might be large enough to be affected by centrifugal force are prevented from traversing the barrier layer 28, so they will not enter the filter disks 11. Therefore, such particles 63 cannot accumulate and clog the internal core 19 of the disks 11.

FIG. 4 illustrates the flow patterns of oil droplets 62 under optimum operating conditions. When the disks 11 are spun at relatively high speeds, the fluid tends to flow along flow lines 69 which start from the area between adjacent disks 11 and go in a direction radially inward toward the shaft 12. The fluid then curves and flows back radially outward toward the inner wall 81. Solid particles 63 tend to be inhibited from crossing the barrier layer 28, and are expelled radially outward towards the inner wall 81. Some fluid diffuses across the barrier layer 28 and enters the disk 11. The fluid that enters the disk 11 then flows into the hollow shaft 12 and is expelled out from the DPS 10. As stated previously, the filtration action occurs mainly at the barrier layer 28, not at the surface 25 of the disk 11.

Oil droplets 62 tend to flow radially inward in the area that is approximately equidistant from adjacent disks 11. The oil droplets 62 tend to accumulate near the shaft 12 in a area with a relatively low radial velocity. Oil droplets accumulating near the shaft 12 migrate upward through relief passageways 64 defined by the relief holes 60 in the disks 11. Specifically, oil droplets 62 from the area below a disk 11 will pass through the relief hole 60 in the disk 11 and continue to migrate upward near the shaft 12. These oil droplets 62 will continue migrating upward through the relief passageway 64 until reaching the top of the chamber 14. The oil 62 accumulated proximate the top 61 of the chamber 14 may be expelled from the chamber 14 through the first fine separated discharge outlet 65.

Figure 3:
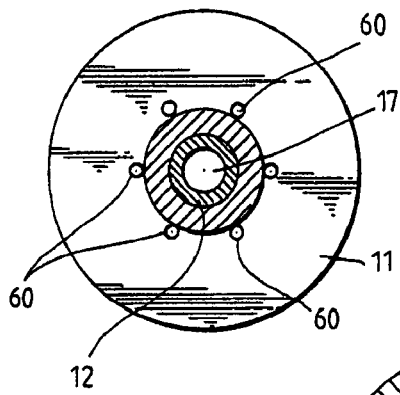
FIG. 3 shows a top view of a single rotary disk utilized in the rotary filter disk filter in FIG. 2, illustrating the expungement passageways provided through the disk.

The relief holes 60 of each disk 11 are preferably immediately above and in substantial axial alignment with the holes 60 in adjacent disks 11 above and below it. Referring to FIG. 3, each disk 11 preferably has six relief holes 60, which are preferably substantially equidistantly spaced around the channel 17 through which the hollow shaft 12 is received. Although six relief holes 60 are shown any number of relief holes may be provided, as desired. The relief holes 60 are preferably located as close as possible to the shaft 12. It is preferred to locate the relief holes 60 in an area of the disk 11 with a relatively low surface velocity in order to accomplish the desired migration of oil droplets 62 upward through the arrangement of rotating disks 11. In the illustrated embodiment, the disks 11 are separated by spacers 72. The relief holes 60 are preferably disposed as close as possible to the surface of the spacers 72.

Referring to FIG. 2, when the filter disks 11 are rotated at relatively high speeds, to some extent a rotational movement will tend to be imparted to the fluid in the chamber 14. This rotational movement of the fluid in the chamber 14 will develop a centrifugal force which will tend to urge particles in an area 26 between barrier layers 28, radially outward toward the inner wall 81 of the chamber 14. This centrifugal force acts external to the filter disks 11.

A significant advantage of the present invention resides in the effectiveness of the barrier layer 28 in separating undesired particles. Filtration is, in effect, accomplished by the barrier layer 28. This phenomenon creates an ability to achieve separation of particles smaller in size than the pore size of the filter membrane 22. Clogging is avoided or reduced because the barrier layer 28 inhibits particles 63 from ever reaching the filter membrane 22.

In the illustrated example, the internal core 19 of the disks 11 has relatively large pores on the order of approximately 20 to approximately 100 microns. The exemplary internal core 19 is approximately one-quarter inch thick. Filter membrane 22, in the example, is between approximately 15 to approximately 20 thousandths of an inch thick, having an average pore size of approximately 2 microns. The exemplary pore sizes ranges from approximately 0.5 microns to approximately 10 microns but even larger pore sizes may provide satisfactory results.

The shape of the filter disk 11 is preferably a substantially smooth concentric disk 11 of substantially parallel wall construction. Disks 11 could also be tapered. Conical corrugated or ribbed disks may alternatively be employed. The center of the disk 11 is preferably machined with an appropriately sized shaft hole. In the illustrated example, the machining is accomplished using an electric discharge machining (EDM) process to insure that the inner porous surface of the internal core 19 that contacts the shaft ports 70 is not sheared over by normal machining methods, thereby limiting fluid communication.

Some suitable materials for the internal core 19 and filter membrane 22 include sponge iron, mild steel, stainless steel and its alloys, nickel and its alloys (e.g., Inconel or Monel), copper and its alloys (e.g., brass, evedure or bronze, Hasteloys, Carpenter 20, tantalum), ferrous and nonferrous metals, or any other metal capable of being sintered. In a corrosive environment, porous plastic may be preferred. Any material capable of being particlized and then homogeneously bonded to form a porous structure would be suitable. Combinations of the above materials is also contemplated and within the intended scope of the invention.

The foregoing discussion frequently refers to the establishment of a barrier layer in the "fluid" that is being separated. It should be understood that the term "fluid" is defined herein as matter which is generally in a liquid state. The differences between the flow patterns of a gas as opposed to a liquid result in such a high level of unpredictability that no conclusions can be drawn regarding the parameters necessary to establish a barrier layer 28 in a gas.

While the above discussion has dealt with oil droplets 62, which were used for purposes of describing the operation of the invention, other phases (e.g., liquids and gases) may be separated in accordance with the principles of this invention. A first fluid may be separated from a second fluid having a specific gravity heavier than the first fluid. The filter disks 11 are prewetted with the fluid which is desired to be removed. This utilizes the capillary affinity of the liquid, which is sometimes referred to in the art as preferentially wetting the disks 11 with the liquid to be separated. The relatively small capillary interstices 24 in the membrane 22 are sufficiently small that the cohesive forces of the molecules tend to exclude other liquids from the interstices 24.

The present invention may be used to separate relatively small bubbles of gas or air from a liquid in the same manner as the oil droplets 62 described above.

In some cases, a heavier liquid may be allowed to migrate through the relief holes 60 to the lower funnel or hopper 89 of the chamber 14. In the case of a heavier liquid, the second gross separated discharge outlet 82 could function as a purge outlet at the bottom of the chamber 14.

During operation, the shaft 12 and filter disk 11 are rotated at relatively high speeds to accomplish unique separation action by establishing a barrier layer 28, as described more fully below.

Fluid to be separated is introduced substantially tangentially through the feed inlet 15 defined in the outer wall 80 into the gross separation region 87 of the chamber 14 defined between the outer and inner walls 80, 81, respectively. The imparted rotation and dwell time allows for gross phase separation. By rotating the fluid containing various phases, rotational and the gravitational forces cause a gross amount of the lighter phase liquid 91 (e.g., oil) to rise to the top of the gross separation region 87 for discharge from the first gross separation discharge outlet 83. On the other hand, heavier phase particles 92 drop as a result of gravitational and rotational forces to the lower funnel or hopper 89 at the bottom of the chamber 14 and pass through the second gross separation discharge outlet 82 thereby bypassing the fine separation region 86 altogether.

The gross separated influent exiting from the gross separation region 87 is rotating as it enters the lower funnel or hopper area 89 and flows upward into the fine separation region 86. Rotation of the filter disks 11 draws the gross separated influent (now substantially free of lighter gross separated liquids or gasses such as slugs of oil and heavier solids) from the lower hopper region upwards through the opening 85 in the inverted funnel or hopper of the 90 of the inner wall 81 into the fine separation region 86 displacing the effluent discharge leaving the DPS device 10 through the first fine separated discharge outlet 65.

Once in the fine separation region 86, the gross separated influent including lighter liquids and solids passes upward through the relief holes 60 in the filter disks 11 and due to the relatively low pressure area at the center of the rotating fluid developed by the DPS's fluid dynamics, the lighter phase fluid (e.g., oil) rises to the top center of the rotating mass. This is the lowest pressure area in the chamber 14 and lighter phase liquids or gasses are discharged through first fine separated discharge outlet 65 as it accumulates along the top of the chamber 14. A portion of the gross filtrate influent will pass through the porous filter disks 11 into a channel 17 defined in the hollow shaft 12. The separated fluid eventually exits the separator 10 through the first fine separated discharge outlet 65.

Lighter particles in the gross separated influent are spun outward by centrifugal force towards the inner wall 81. These lighter particles collect and settle due to gravity at the bottom of the inverted funnel or hopper 90 of the inner wall 81. Due to its inverted tapered shape, the fine solids accumulate radially outwards and are ejected from the chamber through the second fine separated discharge outlet 84 defined in the outer and inner walls 80, 81, respectively.

It will be appreciated from the above discussion that practice of the invention requires observance of several operating parameters. The pore size of the disks and the relationship of the particle size in the fluid being separated are but several parameters to be considered to prevent clogging the filter. In addition, the pressure should be maintained in a range sufficient to provide adequate flow rates without forcing too much oil into the disks.

Significant interrelated factors for the establishment of a barrier layer are disk size and rotational speed of the disks. Specifically, the conditions for establishment of a barrier layer is proportional to the radius of the disks and the rpm of the disks and is inversely proportional to the applied pressure. This condition is expressed as a required minimum surface velocity for the disk of at least approximately 15 feet per second for a liquid. If frequent backpulsing is needed, for example, in excess of approximately 10 times an hour, then that is an indication that the required barrier layer has not been successfully formed. In that event, the above parameters of disk size or rotational speed must be increased, the pressure decreased, or a combination of the above. It may also be helpful to adjust the pore size to particle size in some cases.

The invention disclosed herein is capable of achieving certain advantages. It can handle varying concentrations of two liquids, and even excessive imbalances in concentration, without adjustment. A wide range of concentrations and variation in the influent or feedstock to be separated are permitted with the present invention. Ultra separation of relatively small particles may be accomplished, while at the same time separating oil and gas from water, for example. The invention will handle mixtures having relatively large concentrations of fluid to be separated. The invention is compact, and weighs less for a similar capacity separator of a different design. Wide differences in the densities of the two liquids to be separated is not required. The invention minimizes or eliminates clogging of the filter elements thereby minimizing the need for filter element replacement and expensive downtime. It also reduces pumping requirements and back pressure.

Thus, while there have been shown, described, and pointed out fundamental novel features of the invention as applied to a preferred embodiment thereof, it will be understood that various omissions, substitutions, and changes in the form and details of the devices illustrated, and in their operation, may be made by those skilled in the art without departing from the spirit and scope of the invention. For example, it is expressly intended that all combinations of those elements and/or steps that perform substantially the same function, in substantially the same way, to achieve the same results be within the scope of the invention. Substitutions of elements from one described embodiment to another are also fully intended and contemplated. It is also to be understood that the drawings are not necessarily drawn to scale, but that they are merely conceptual in nature. It is the intention, therefore, to be limited only as indicated by the scope of the claims appended hereto.

Every issued patent, pending patent application, publication, journal article, book or any other reference cited herein is each incorporated by reference in their entirety.

What is claimed is:

1. A dynamic phase separator for separation of a multi phase mixture influent, comprising;
   a housing defining a chamber divided into two regions by a non-porous inner wall disposed radially inward relative to an outer wall, a gross separation region defined between the inner wall and the outer wall, a fine separation region inside an area defined by the inner wall and a top of the chamber, an inlet defined in the outer wall for receiving in the gross separation region the multi-phase mixture influent to be separated;
   a rotatable shaft disposed within the fine separation region, the shaft having a channel defined through at least a portion thereof; and
   a plurality of porous disks disposed only in the fine separation region and mounted to the rotatable shaft, the disks being in fluid communication with the channel in the shaft, the disks having a substantially smooth surface to minimize turbulence during rotation and relief holes defined therein proximate the rotatable shaft;
   wherein the outer and inner walls are connected so that a top end of the gross separation region is closed to prevent the flow of the multi-phase mixture influent to be separated from the gross separation region to the fine separation region; at an opposite lower end of the gross separation region the outer and inner walls remain unbounded thereby permitting gross separated influent to pass freely from the gross separation region into the fine separation region;
   wherein the chamber has a first gross separated discharge outlet and a second gross separated discharge outlet each in fluid communication with the gross separation region, the first gross separated discharge outlet disposed proximate the top end of the gross separation region while the second gross separated discharge outlet being disposed proximate the opposite lower end of the gross separation region, gross separated lighter phase being expelled through the first gross separated discharge outlet and gross separated heavier phase being expelled via the second gross separated discharge outlet; and the chamber has a first fine separated discharge outlet and a second fine separated discharge outlet each in fluid communication with the fine separation region, the first fine separated discharge outlet being disposed proximate the top of the chamber and in fluid communication with the passageway and relief holes, while the second fine separated discharge outlet being disposed at its opposite end, fine separated lighter phase being expelled through the first fine separated discharge outlet and fine separated heavier phase being expelled via the second fine serrated discharge outlet;
   wherein the fine separation region terminates in a funnel turned inside out so that its stem is disposed within the fine separation region, an opening defined in the stem of the inside out funnel provides the only fluid communication passageway between the gross separation region and the fine separation region.

2. The separator according to claim 1, wherein at least a portion of the outer and inner walls are substantially parallel to one another so that the gross separation region forms an annulus therebetween.

3. The separator according to claim 1, wherein the inlet is disposed proximate the top end of the gross separation region.

4. The separator according to claim 1, wherein the outer and inner walls are separated from one another by a predetermined distance sufficient to allow for adequate rotational velocity of incoming tangential flow of the multi-phase mixture influent and dwell time sufficient for natural separation of lighter phases from heavier phases within the gross separation region.

5. The separator according to claim 4, wherein the greater the predetermined distance separation between the inner and outer walls the longer the dwell time for flow imbalance of the multi-phase mixture influent to be processed in the gross separation region, while the smaller the predetermined distance separation between the inner and outer walls the greater volume for the fine separation region and maximum rotational velocity spin off of unwanted product.

6. The separator according to claim 4, wherein the predetermined distance separation between the outer and inner walls is dependent on at least one of flow rate of the multi-phase mixture influent to be separated and anticipated potential flow imbalances of slugs.

7. The separator according to claim 6, wherein the higher flow rate of multi phase mixture influent to be separated the greater distance separation between the outer and inner walls to accommodate abrupt changes of excessive amounts of unwanted product.

8. The separator according to claim 6, wherein the greater the frequency of anticipated potential flow imbalances of slugs the greater the predetermined distance separation between the outer and inner walls to accommodate the anticipated imbalance.

9. The separator according to claim 1, wherein the gross separation region terminates in a tapered cone with the second gross separated discharge outlet defined therein.

10. The separator according to claim 1, wherein the disks have a diameter greater than approximately 4 inches.

11. The separator according to claim 1, further comprising a motor for rotating the disks at a sufficient speed to provide a working area on the surface of the disk having a surface velocity greater than approximately 15 feet per second.

12. A method for using the dynamic phase separator according to claim 1; the method comprising the steps of:
   rotating the disks at a sufficient speed to provide a working area on the surface of the disk having a surface velocity greater than approximately 15 feet per second.

13. The method according to claim 12, prior to the rotating step, further comprising the step of selecting a predetermined distance separation between the outer and inner wails sufficient to allow for adequate rotational velocity of incoming tangential flow of the multi-phase mixture influent and dwell time sufficient for natural separation of lighter phases from heavier phases within the gross separation region.

14. The method according to claim 12, wherein at least a portion of the outer and inner walls are substantially parallel to one another so that the gross separation region forms an annulus therebetween.

15. The method according to claim 12, wherein the gross separation region terminates in a tapered cone with the second gross separated discharge outlet defined therein.

* * * * *